(12) United States Patent
Jaye

(10) Patent No.: US 6,367,317 B1
(45) Date of Patent: Apr. 9, 2002

(54) ALGORITHM FOR DETERMINING THE TOP DEAD CENTER LOCATION IN AN INTERNAL COMBUSTION ENGINE USING CYLINDER PRESSURE MEASUREMENTS

(75) Inventor: John R Jaye, Northville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/512,710

(22) Filed: Feb. 24, 2000

(51) Int. Cl.$^7$ .............................................. G01M 15/00
(52) U.S. Cl. ......................................................... 73/116
(58) Field of Search .......................... 73/112, 115, 116, 73/117.2, 117.3; 701/101

(56) References Cited

U.S. PATENT DOCUMENTS

| | | | |
|---|---|---|---|
| 4,131,098 A | | 12/1978 | Daniels et al. |
| 4,266,427 A | | 5/1981 | Wesley |
| 4,562,728 A | * | 1/1986 | Timmerman ................. 73/116 |
| 4,744,243 A | | 5/1988 | Tanaka |
| 4,800,500 A | * | 1/1989 | Tanaka ........................ 73/115 |
| 4,846,129 A | | 7/1989 | Noble |
| 4,970,667 A | * | 11/1990 | Abo |
| 5,020,360 A | * | 6/1991 | Brosi et al. .................... 73/115 |
| 5,351,528 A | * | 10/1994 | Fukui et al. ................... 73/115 |
| 5,442,954 A | * | 8/1995 | Fukui et al. ................... 73/115 |
| 5,611,311 A | | 3/1997 | Tomisawa |
| 5,758,307 A | * | 5/1998 | Haefner et al. |
| 5,765,532 A | * | 6/1998 | Loye |

* cited by examiner

*Primary Examiner*—Eric S. McCall
(74) *Attorney, Agent, or Firm*—Mark P. Calcaterra

(57) ABSTRACT

A method of determining a top dead center location of a piston in an internal combustion engine including the steps of determining a pressure versus crankshaft angle relation during a compression and an expansion portion of engine operation, defining a pressure ratio relation as the pressure at x number of degrees before a reference crankshaft angle divided by the pressure at x number of degrees after the reference crankshaft angle and shifting the pressure ratio relation a corrective number of degrees to obtain a model shape. Accordingly, the top dead center position is defined relative to the reference crankshaft angle.

15 Claims, 4 Drawing Sheets

ALGORITHM FOR DETERMINING THE TOP DEAD CENTER LOCATION IN AN INTERNAL COMBUSTION ENGINE USING CYLINDER PRESSURE MEASUREMENTS

BACKGROUND OF THE INVENTION

1. Technical Field

The present invention relates to a diagnostic method for an engine and, more particularly, to an algorithm for determining the top dead center location in an internal combustion engine.

2. Discussion

As is commonly known in the field of internal combustion engine design, it is advantageous to know the relative position of each piston within its combustion cylinder in order to properly time an ignition signal or a fuel injection signal or both. Specifically, it is beneficial to know the top dead center (TDC) position of a piston because it is at this time where compression is at its peak. Unfortunately, once the engine has been assembled, the piston is concealed from view and determination of the top dead center is difficult.

In the past, a variety of methods and apparatus have been used for determining the piston top dead center position. One such system involves marking a rotating component coupled to the crankshaft such as a harmonic balancer or an engine flywheel relative to a sensor or scale located at a fixed point on the engine. Theoretically, the marking aligns with the fixed reference point at TDC. Unfortunately, this system suffers from the inaccuracies involved with mechanically positioning the markings or sensors to correspond to the actual position of the piston within the cylinder. Regardless of the amount of care taken in positioning the aforementioned markings in a static condition, additional error is introduced once the crankshaft begins to rotate. Specifically, assembly clearances in combination with component inertia, stretch and compression increase the difficulty of determining piston TDC relative to crankshaft angle.

Another system incorporates the use of a pressure transducer within the cylinder to determine the maximum cylinder pressure generated while the valves are closed. While this data collection method may be beneficially employed to provide a real time trace of cylinder pressure per crankshaft angle of rotation, difficulty arises when attempting to accurately determine the piston TDC. For example, one current method of determining the piston top dead center location relies on the shape of the log pressure versus log crankshaft angle curve noting that the trace forms a knife edge as the combustion stroke reverses to an expansion stroke. The technique involves manipulating the data collected relative to a reference crankshaft angle and offsetting the data set a number of degrees to achieve the knife edge plot shape. Once the knife edge is graphically determined, TDC is defined relative to the reference crankshaft angle. While this method has been useful for obtaining a rough estimate of the actual TDC position, the method lacks the ability to discern small changes in crank angle such as within a range of 2–3 degrees.

Unfortunately, errors approaching 0.5 degrees in TDC location may significantly affect internal combustion engine performance. Specifically, diesel engine performance is effected by errors in crankshaft angle as small as 0.1 degrees from top dead center. Therefore, a need exists for a simple, real time analysis technique capable of accurately determining the top dead center location in an internal combustion engine.

SUMMARY OF THE INVENTION

Accordingly, it is an object of the present invention to define an algorithm for determining the top dead center location of a piston in an internal combustion engine using cylinder pressure measurements.

It is another object of the present invention to provide a graphical method of accurately determining the top dead center location of a piston in an internal combustion engine cylinder piston.

The present invention includes a method of determining a top dead center location of a piston in an internal combustion engine including the steps of determining a pressure versus crankshaft angle relation during a compression and an expansion portion of engine operation, defining a pressure ratio relation as the pressure at x number of degrees before a reference crankshaft angle divided by the pressure at x number of degrees after the reference crankshaft angle and shifting the pressure ratio relation a corrective number of degrees to obtain a model shape. Accordingly, the top dead center position is defined relative to the reference crankshaft angle.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
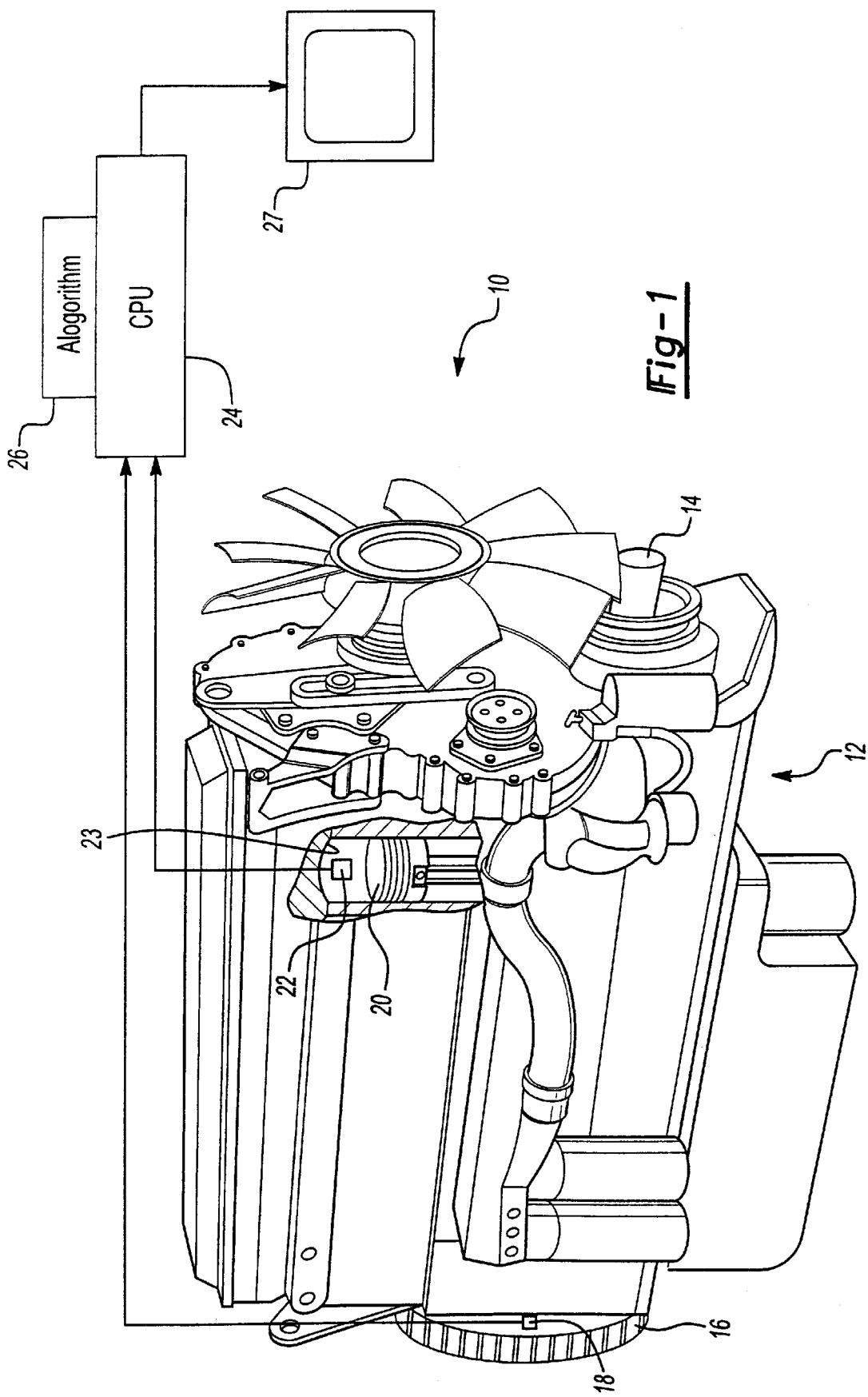
FIG. 1 is a perspective view of a motor vehicle engine test cell constructed in accordance with the teachings of an embodiment of the present invention.

With initial reference to FIG. 1, a motor vehicle engine test cell constructed in accordance with the teachings of an embodiment of the present invention is generally identified at reference numeral 10. The test cell 10 includes an engine 12 having a crankshaft 14 for supplying power to drive line components and driven wheels (not shown). At the end of the crankshaft 14, a flywheel 16 is affixed thereto. In a preferred embodiment, a crankshaft position sensor 18 cooperates with the flywheel 16 to determine the position of the crankshaft 14 in relation to at least one of the pistons 20. Specifically, the flywheel is marked at engine build to refer to an approximate or reference top dead center location (TDC ref.). During engine operation, the crankshaft sensor 18 is signaled as the mark passes thereby indicating the TDC ref. location. One skilled in the art will appreciate that other devices may be utilized to provide crankshaft rotational position data. For example, an encoder may be mounted to the front of the crankshaft 14 without departing from the scope of the present invention.

The test cell 10 further includes a system for obtaining internal cylinder pressure data. Specifically, a pressure sensor 22 is located within at least one of the combustion chambers 23 between the head and the piston 20. Accordingly, the pressure sensor 22 is subject to the compression and expansion forces generated during engine operation. Piezo-electric sensors commonly known in the art are likely candidates for accurately measuring pressure within the small envelope defined by an internal combustion engine cylinder.

A central processing unit 24 is in communication with the crankshaft sensor 18 and the pressure sensor 22 for collecting and manipulating the data provided by each of the sensors 18 and 22. In addition, the central processing unit 24 is equipped to access an algorithm 26 for determining the actual top dead center location (TDC act.) of a piston 20 using cylinder pressure measurements provided by the pressure sensor 22. In the preferred embodiment, a monitor 27 is electrically coupled to the central processing unit 24 for providing real time graphical results to an analyst.

Figure 2:
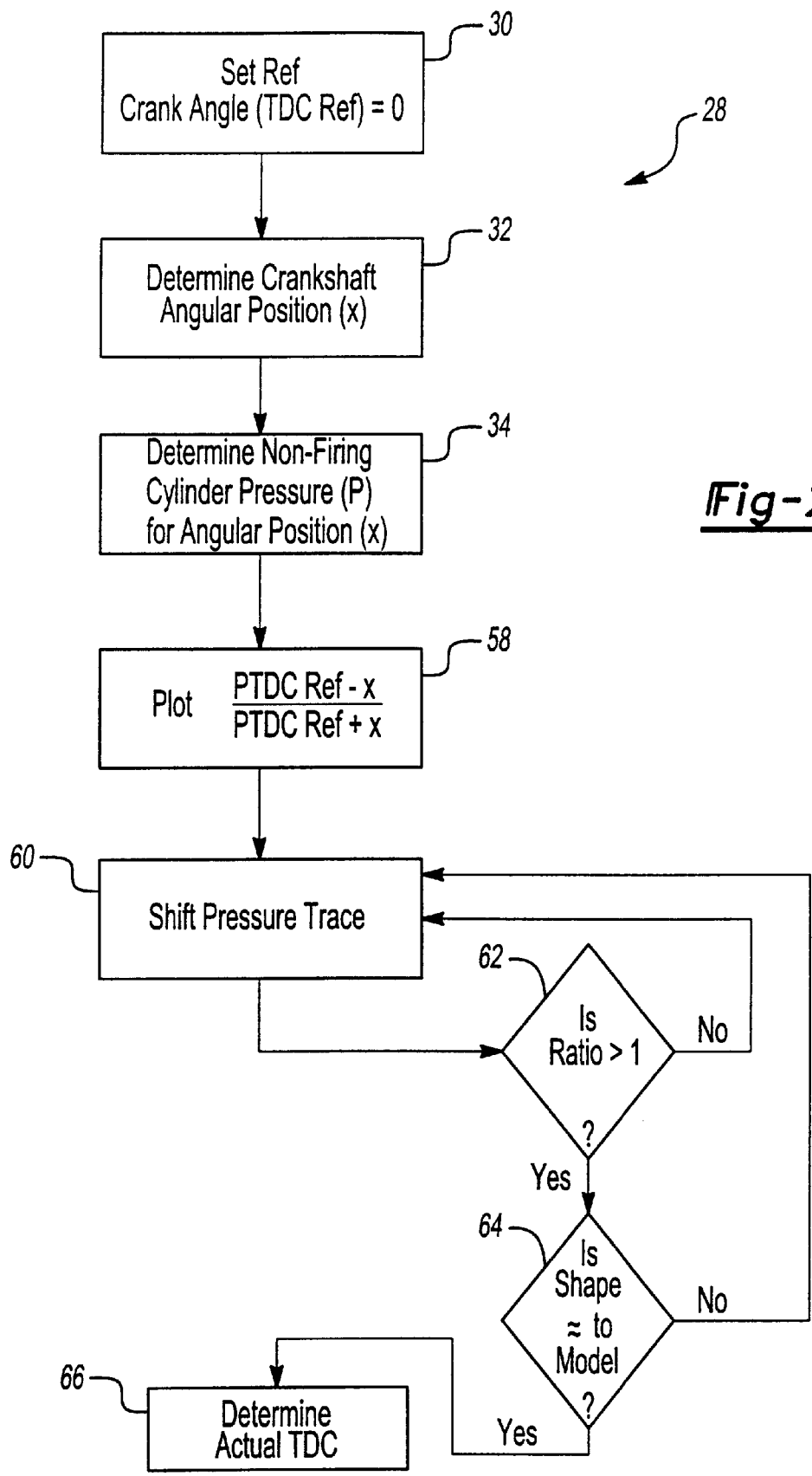
FIG. 2 is a global flow diagram representative of the process steps performed during determination of the actual top dead center position.

Referring now also to FIG. 2, a global flow diagram representative of the process steps performed during the determination of the actual top dead center position including those performed by the algorithm 26 of the present invention is generally identified at reference numeral 28. At block 30, the algorithm begins by setting TDC ref. equal to zero. As mentioned earlier, TDC ref. is simply a mechanical approximation of the actual top dead center location sought by the use of the algorithm 26 of the present invention.

Figure 3:
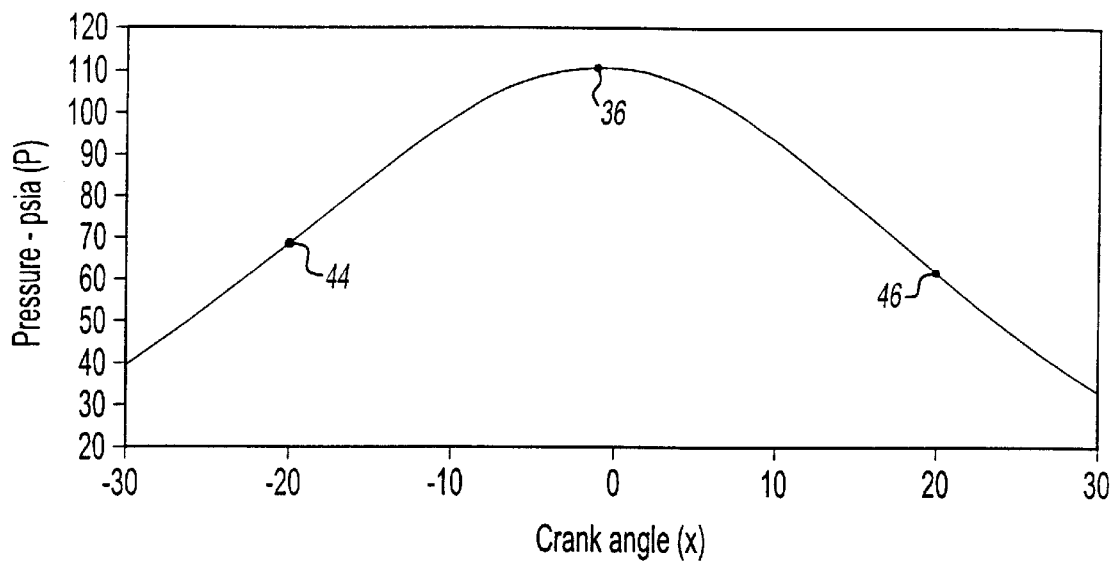
FIG. 3 is a graph depicting crankshaft angle versus cylinder pressure.

In block 32 an angular position (x) of the crankshaft 14 is determined. In block 34, the pressure (P) generated within the cylinder is determined for each crankshaft angular position (x) as the crankshaft 14 rotates. Utilizing the data collected, a crankshaft angle versus cylinder pressure graph may be plotted as shown in FIG. 3. Referring now to FIG. 3, it should be appreciated that a peak pressure 36 occurs approximately one half degree prior to reaching actual top dead center. The timing shift is due to heat transfer and irreversibility losses during compression. As a point of reference, it should be appreciated that an adiabatic and isentropic engine would exhibit a peak pressure at TDC. However, the characteristic one half degree phase shift of cylinder pressure along the crankshaft angle axis exists within the commonly manufactured internal combustion engines of today. Accordingly, through the use of the present invention described in greater detail hereinafter, TDC act. may be accurately determined using cylinder pressure measurements.

Figure 4:
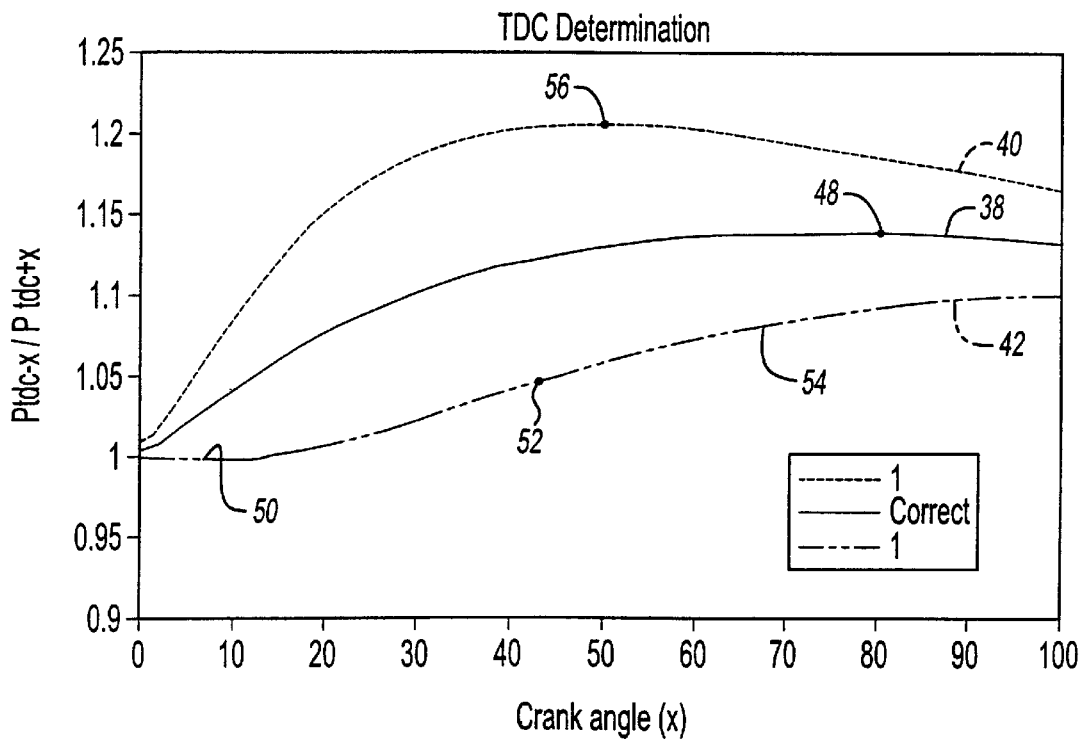
FIG. 4 is a graph depicting a set of pressure ratio curves plotted according to the algorithm for determining the top dead center location in an internal combustion engine of the present invention.

Referring to FIG. 4, a representative set of pressure ratio curves are plotted according to the algorithm: Pressure Ratio=$P_{TDC+x}/P_{TDC-x}$. When TDC act. is correctly determined, a pressure ratio curve shaped substantially similar to curve 38 results. Curves 40 and 42 represent pressure ratio curves generated using incorrectly determined top dead center positions of advanced one degree (−1) and retarded one degree (+1), respectively. Accordingly, the shape of the pressure ratio curve 38 serves as a model when determining actual top dead center.

The algorithm 26 exploits the fact that the cylinder pressure will be higher on compression at a given angle (x) rather than on expansion. For example and as illustrated in FIG. 3, the pressure during compression at −20 degrees crankshaft angle equals 68 psia at point 44. On the other hand, the expansion pressure at +20 degrees crankshaft angle equals 62 psia at point 46. Accordingly, a proper top dead center location corresponds to a pressure ratio greater than one.

Additionally, because the peak pressure 36 (FIG. 3) occurs approximately one half degree advanced of the top dead center location, the ideal or model pressure ratio curve 38 (FIG. 4) will reach a maximum value of approximately 1.13 at point 48 when TDC act. is properly defined. The maximum pressure ratio of 1.13 value may vary due to the specific engine displacement, leakage, cylinder surface temperatures, and compression ratio chosen. However, it should be appreciated that the majority of maximum pressure ratios fall within the range of 1.08–1.18.

Similarly, and in reference to FIG. 4, the shape of the correctly determined TDC act. pressure ratio curve 38 exhibits distinctive characteristics allowing the analyst to quickly and accurately define the actual top dead center position. As noted earlier, each point defining curve 38 is greater than 1. Also, the model curve 38 is substantially convex in shape obtaining its maximum magnitude at approximately 80 to 90 degrees from TDC ref. as shown at point 48. The peak occurs within this range of crankshaft angles due to heat transfer during the cycle and the temperature of the cylinder surfaces. Engines with cooling systems designed to run at or near 100° C. will exhibit the characteristics of curve 38. Hotter running engines will have a point 48 occurring earlier in time (approximately 50–70 degrees) and slightly lower in value.

Alternatively, the curve 42 includes points below a magnitude of 1. In addition, curve 42 includes a concave portion 50, an inflection point 52 and a convex portion 54. Curve 40 also contains graphically determinable indicia of error in determining TDC act. Curve 40, while containing points greater than 1 and being convexedly shaped, peaks too early. Specifically, a point 56 represents the maximum of curve 40 occurring at approximately 50 degrees from TDC ref.

Based on the model curve characteristic features defined above, an analyst may proceed to invoke the remaining steps defined in the global flow diagram 28 of FIG. 2. Once the pressure ratio curve is defined in block 58, the analyst offsets or shifts the pressure data by very small increments or corrective amounts of crankshaft angle via the central processing unit 24 as shown in block 60. Decision block 62 tests the resultant curve shape to assure that all points within the curve are greater than 1. If some points are equal to or less than one, additional curve shifting occurs.

Decision block 64 notes that the maximum value of the pressure ratio curve should occur between 80 and 90 degrees from TDC ref. In addition, the curve should be substantially convex along its length. If these criterion are not met, the curve should be further shifted to find TDC act.

Once the analyst has successfully matched the shape of the real time pressure ratio curve to model curve 38 (FIG. 4), block 66 determines TDC act. by summing the corrective amount with TDC ref. At this time it should be appreciated that the present invention provides a simple, real time method for discerning the difference between small errors in the determination of top dead center.

Figure 5:
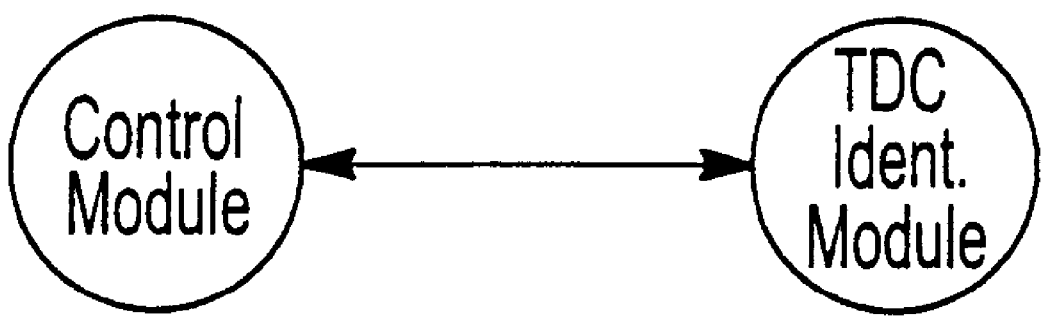
FIG. 5 is a logic diagram showing a graphical representation of an engine control system of the present invention.

In an alternative embodiment, the aforementioned logical steps may be performed by individual modules in communication with each other as shown in FIG. 5. Specifically, a control module 70 is in communication with a top dead center identifier module 72 where the top dead center position of a piston is determined. One skilled in the art will appreciate that the control module 70 may directly control the engine 12 (FIG. 1), or may signal an electronic control module (not shown) coupled the engine. In this manner, the present invention may function outside of the test cell on a functioning vehicle without the assistance of an analyst.

It is intended that the invention not be limited to the particular embodiments illustrated by the drawings and described in the specification contemplated for carrying out this invention, but that the invention will include any embodiment falling within the description of the appended claims.

What is claimed is:

1. A method for determining a top dead center location of a piston in an internal combustion engine, the method comprising the steps of:
    setting a reference crankshaft angle;
    determining a cylinder pressure in relation to said reference crankshaft angle during a compression stroke and an expansion stroke;
    defining a pressure ratio curve as a first pressure at a negative first number of degrees from said reference crankshaft angle divided by a second pressure at a positive of said first number of degrees from said reference crankshaft angle; and
    determining said top dead center location by shifting said cylinder pressure a corrective amount of crankshaft degrees until a shape of said pressure ratio curve conforms with a model pressure ratio curve.

2. The method of claim 1 wherein said step of determining a cylinder pressure includes measuring a pressure during a non-firing cycle.

3. The method of claim 1 wherein said model pressure ratio curve has a ratio value greater than 1 at each of said number of degrees from said reference crankshaft angle.

4. The method of claim 3 wherein said model pressure ratio curve is substantially convex along its length.

5. The method of claim 4 wherein said model pressure ratio curve reaches a maximum in a range of 80 to 90 degrees from said reference crankshaft angle.

6. The method of claim 5 wherein said maximum of said model pressure ratio curve is in a range of 1.08 to 1.18.

7. A method of determining a top dead center location of a piston in an internal combustion engine, the method comprising the steps of:
    determining a pressure versus crankshaft angle relation during a compression and an expansion portion of engine operation;
    defining a pressure ratio relation as said pressure at x number of degrees before a reference crankshaft angle divided by said pressure at x number of degrees after said reference crankshaft angle; and
    shifting said pressure ratio relation a corrective number of degrees to obtain a model pressure ratio curve, thereby defining the top dead center position relative to said reference crankshaft angle.

8. The method of claim 7 wherein the step of determining a pressure includes disposing a pressure sensor in a cylinder.

9. The method of claim 8 wherein the step of determining a pressure occurs in real time.

10. The method of claim 7 wherein said model pressure ratio curve is substantially convex in shape.

11. The method of claim 10 wherein said model pressure ratio curve reaches a maximum ratio value of approximately 1.13.

12. The method of claim 11 wherein said model curve reaches said maximum when x is approximately 80 degrees from said reference crankshaft angle.

13. An engine control system for a motor vehicle comprising:
    a control module and
    a top dead center identifier module for determining a top dead center position of a piston, said top dead center identifier module in communication with said control module, said control module notifying said engine control system of said top dead center position;
    wherein said top dead center identifier module includes an algorithm for calculating a pressure ratio curve; and
    wherein said top dead center identifier module determines a corrective number of crankshaft degrees to offset said pressure ratio curve to correspond to a model pressure ratio curve.

14. The engine control system of claim 13 wherein said model pressure ratio curve is defined by points greater than a ratio of 1.

15. The engine control system of claim 14 wherein said model pressure ratio curve peaks at approximately 80 crankshaft degrees from said top dead center position.

* * * * *